United States Patent Office 3,803,131
Patented Apr. 9, 1974

3,803,131
HETEROCYCLIC COMPOUNDS AND PROCESSES
FOR THEIR PREPARATION
Peter Stoss, Wildtal, and Gerhard Satzinger, Gundelfingen, Germany, assignors to Warner-Lambert Company, Morris Plains, N.J.
No Drawing. Filed Feb. 14, 1973, Ser. No. 332,467
Int. Cl. C07d 93/02, 93/40
U.S. Cl. 260—239.3 B                     3 Claims

ABSTRACT OF THE DISCLOSURE

Novel benzothiazines and benzothiadiazepines of the following formula are obtained:

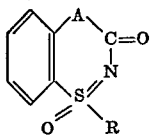

wherein A is a —$CH_2$— or —$CH_2$—NH— group and R is an alkyl group of 1 to 5 carbon atoms or a phenyl group. These compounds exhibit antisecretory activity.

To synthesize the novel heterocyclic compounds of the General Formula I

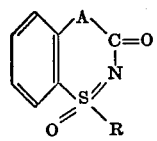

wherein A represents a —$CH_2$— or —$CH_2$—NH— group and R is an alkyl group having 1 to 5 carbon atoms or a phenyl group, a sulfoxide of the General Formula II

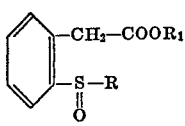

wherein R has the above meaning and $R_1$ represents hydrogen or a lower alkyl group, is reacted with hydrazoic acid

or the salts thereof at a temperature of 70–110°, in the presence of strong inorganic acids, such as sulphuric acid, phosphoric acid or polyphosphoric acid usually with the aid of an inert solvent immiscible with water, such as benzene, toluene, xylene, chlorobenzene, dichlorobenzene, dichloroethane, etc. The reaction products are compounds of the Formula I with A being —$CH_2$— (3-oxo-3,4-dihydro-1,2-benzothiazine-1-oxides) when 1 mol of hydrazoic acid reacts per mol of sulfoxide II. Compounds of the Formula I with A being —$CH_2$—NH— (3-oxo-4,5-dihydro-3H-1,2,4-thiadiazepine-1-oxides) are formed when 2 mols of hydrazoic acid react with each mol of sulfoxide II.

The compounds of the General Formula I, prepared according to the invention are valuable intermediate products for the synthesis of pharmaceutically useful compounds which act on the central nervous system, and also possess therapeutic properties in that they are antisecretory in activity in doses of about 250 mg./kg. of body weight in laboratory animals. The following examples are given to illustrate production of the novel compounds without limiting it, however.

EXAMPLE 1

1-methyl-3-oxo-3,4-dihydro-1,2-benzothiazine-1-oxide and 1-methyl-3-oxo-4,5-dihydro-3H-1,2,4-benzothiadiazepine-1-oxide To a mixture of 100 g. of 85% phosphoric acid, 50 g. of phosphorus pentoxide and 400 cc. of 1,2-dichloroethane 20 g. of sodium azide are added, and the mixture is heated to boiling. A solution of 21.2 g. methyl 2-(methylsulfinyl)-phenyl-acetate in 100 cc. of 1,2-dichloroethane is added dropwise over 1 hour, while stirring. After having refluxed for another 3 hours, the mixture is cooled and alkalized with aqueous potassium hydroxide solution. The organic phase is separated, and the aqueous phase extracted with dichloroethane. The residue of the combined organic phases is recrystallized from isopropanol. 8 g. of 1-methyl-3-oxo-3,4-dihydro-1,2-benzothiazine-1-oxide are obtained—colorless crystals, M.P. 148°.

$C_9H_9NO_2S$ (195.22):
Calcd.: C, 55.37; H, 4.65; N, 7.18; S, 16.41
Found: C, 55.63; H, 4.63; N, 7.33; S, 16.35

When working up the above batch, 1 g. of 1-methyl-3-oxo-4,5-dihydro-3H-1,2,4-benzothiazepine-1-oxide is obtained (colorless crystals M.P. 220°, recrystallized from ethanol).

$C_9H_{10}N_2O_2S$ (210.26):
Calcd.: C, 51.41; H, 4.80; N, 13.32; S, 15.25
Found: C, 51.09; H, 4.82; N, 13.00; S, 15.17

EXAMPLE 2

1-ethyl-3-oxo-3,4-dihydro-1,2-benzothiazine-1-oxide

Into a mixture of 100 g. of 85% phosphoric acid and 50 g. of phosphorus pentoxide 22.6 g. of methyl 2-(ethylsulfinyl)-phenyl-acetate are introduced, and the mixture heated to 80°. 13 g. of sodium azide are added in portions, while stirring. Then stirring is continued for 3 hours at 80°, whereupon the mixture is cooled and alkalized with aqueous potassium hydroxide solution. The product of the reaction is extracted with dichloroethane, the extract is dried and evaporated. The residue crystallizes from isopropanol in the form of colorless crystals of a M.P. of 99–100°. Yield: 9.4 g.

$C_{10}H_{11}NO_2S$ (209.28):
Calcd.: C, 57.38; H, 5.30; N, 6.69; S, 15.32
Found: C, 57.42; H, 5.23; N, 6.52; S, 15.24

EXAMPLE 3

1-(n-butyl)-3-oxo-4,5-dihydro-3H-1,2,4-thiadiazepine-1-oxide

The reaction is performed by treatment of 110 g. of methyl 2-(n-butyl-sulfinyl)-phenyl-acetate in 400 g. of 85% phosphoric acid and 200 g. of phosphorus pentoxide, with 57 g. of sodium azide according to Example 2. Yield: 18 g. of colorless crystals of a M.P. of 207–208°, recrystallized from isopropanol.

$C_{12}H_{16}N_2O_2S$ (252.35):
Calcd.: C, 57.11; H, 6.39; N, 11.10; S, 12.70
Found: C, 57.01; H, 6.39; N, 10.96; S, 12.46

EXAMPLE 4

1-phenyl-3-oxo-4,5-dihydro-3H-1,2,4-benzothiadiazepine-1-oxide

By reaction of 23 g. of methyl 2-(phenyl-sulfinyl)-phenyl-acetate with 13 g. of sodium azide, in 100 g. of 85% phosphoric acid and 50 g. of phosphorus pentoxide, according to Example 2. Yield: 12.1 g. of colorless crystals of a M.P. of 236°, from ethanol.

$C_{14}H_{12}N_2O_2S$ (272.33):
Calcd.: C, 61.74; H, 4.44; N, 10.29; S, 11.78
Found: C, 61.80; H, 4.44; N, 10.12; S, 11.65

Pharmacologic effectiveness

The compounds being of low toxicity show an inhibitory effect upon gastric secretion and upon acidity of gastric juice without exhibiting anticholinergic side effects. The pharmacologic activity of the compound of Example 2 is given below, the general activity being typical of the group.

Acute toxicity

Tests were performed in male mice (NMRI strain) weighing 18–23 g. The animals were kept fasting for 16 hours prior to the beginning of the test; water was available ad libitum. The substance was administered to the animals in logarithmically increasing doses of 50 to 1600 mg./kg. intragastrically by means of a gastric tube. The substance had been suspended in 1% tragacanth mucilage. Observation time amounted to 48 hours. The $LD_{50}$ of the product of Example 2 was found to be 1500 mg./kg. i.g.

Antisecretory effect

The tests were performed according to the method described by Shay. Test animals were male rats (SIV) weighing 140–180 g. The animals were kept fasting in special cages for 48 hours prior to the beginning of the test; water being available ad libitum. The test substance was suspended in 1% tragacanth mucilage and administered intragastrically by means of the gastric tube. In all tests the volume of liquid amounted to 1 ml./100 g. of body weight. One hour following administration of the substance, pylorus ligation was performed under brief ether anaesthesia. The animals were sacrificed four hours after pylorus ligation, the stomachs were removed following ligation of cardia, and opened. The volume and pH value of the stomach contents were determined. The results of these tests are summarized in the following table:

| Substance | Number of animals | Dose, mg./kg. | Gastric contents, ml./100 g. of body weight | pH value |
|---|---|---|---|---|
| Control (tragacanth) | 12 | ---------- | 3.4 | 1.5 |
| Product of Example 2 | 12 | 250 | 1.5 | 2.6 |

We claim:
1. A compound of the formula

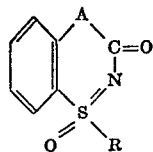

wherein A represents a —$CH_2$— or —$CH_2$—NH— group and R is an alkyl radical of 1 to 5 carbon atoms or a phenyl group.

2. A process for the preparation of a compound according to claim 1, in which a sulfoxide of the formula

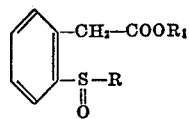

wherein R has the above meaning and $R_1$ represents hydrogen or a lower alkyl group is reacted at 70–110° C. with hydrazoic acid or a salt thereof, in the presence of a strong inorganic acid.

3. Process in accordance with claim 2 wherein an inert water-immiscible solvent is present.

No references cited.

JOHN D. RANDOLPH, Primary Examiner

R. T. BOND, Assistant Examiner

U.S. Cl. X.R.

260—243 R; 424—275